United States Patent
Kim (10) Patent No.: US 10,880,500 B2
(45) Date of Patent: Dec. 29, 2020

(54) PIXEL APPARATUS AND CMOS IMAGE SENSOR USING THE SAME

(71) Applicant: SK hynix Inc., Icheon-si (KR)

(72) Inventor: Tae-Chan Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/218,904

(22) Filed: Dec. 13, 2018

(65) Prior Publication Data

US 2020/0059612 A1    Feb. 20, 2020

(30) Foreign Application Priority Data

Aug. 14, 2018    (KR) .................. 10-2018-0094952

(51) Int. Cl.
| | |
|---|---|
| *H04N 5/341* | (2011.01) |
| *H04N 5/378* | (2011.01) |
| *H04N 5/3745* | (2011.01) |
| *H04N 5/351* | (2011.01) |

(52) U.S. Cl.
CPC ............ *H04N 5/341* (2013.01); *H04N 5/351* (2013.01); *H04N 5/378* (2013.01); *H04N 5/3745* (2013.01)

(58) Field of Classification Search
CPC ........ H04N 5/341; H04N 5/351; H04N 5/378; H04N 5/3745
See application file for complete search history.

(56) References Cited

U.S. PATENT DOCUMENTS

2019/0028661 A1 *    1/2019    Nikai .................. H04N 5/3535

FOREIGN PATENT DOCUMENTS

| KR | 10-1838894 | 3/2018 |
|---|---|---|
| KR | 10-1853242 | 4/2018 |

* cited by examiner

*Primary Examiner* — Tony Ko
(74) *Attorney, Agent, or Firm* — Perkins Coie LLP (57) ABSTRACT

A pixel apparatus may include a pixel circuit and a voltage attenuator. The pixel circuit includes multiple pixels, each pixel including photoelectric conversion element. The pixel circuit is structured to receive incident light and output an output signal having pixel voltages in response to the received incident light. The pixel circuit operates in at least one of a quad mode outputting the output signal based on photocharges from a single photoelectric conversion element only and a multi-sum mode outputting the output signal based on photocharges from multiple photoelectric conversion elements. The voltage attenuator is coupled to the pixel circuit. The voltage attenuator can be enabled, when the pixel circuit operates in the multi-sum mode, to receive the output signal and adjust the pixel voltages of the output signal by a predetermined ratio determined by the multi-sum mode.

15 Claims, 4 Drawing Sheets

PIXEL APPARATUS AND CMOS IMAGE SENSOR USING THE SAME

CROSS-REFERENCE TO RELATED APPLICATION

This patent document claims the priority and benefits of Korean Patent Application No. 10-2018-0094952 filed on Aug. 14, 2018, which is incorporated herein by reference in its entirety.

TECHNICAL FIELD

The technology and implementations disclosed in this patent document relate to a complementary metal oxide semiconductor (CMOS) image sensor (CIS) including a pixel apparatus, and a comparison device.

BACKGROUND

Image sensors use photosensing pixels to capture images and can be implemented as complementary metal oxide semiconductor (CMOS) image sensor (CIS) devices. It is desirable to design image sensor in ways to achieve certain device features or performance. For example, the dynamic range of an image sensor, together with image noise and resolution, may be recognized as a major performance indicator of a device or system (for example, a camera or others) which includes an image sensor. The dynamic range is related to a monotone range which can be recognized by an image sensor. As the dynamic range is increased, the image sensor can output an image with more tones, and a pixel resolution can be higher.

In a specific situation, a device including an image sensor may bin or combine charges or signals generated by multiple pixels into a single signal. For example, pixel binning may be used in a case when a camera outputs a lower image resolution than an image sensor included in the camera, or used to increase sensitivity of an image when the image is captured in a low illumination circumstance.

SUMMARY

Various embodiments are directed to a pixel apparatus including a voltage attenuator which can adjust an output signal with a pixel voltage when the pixel apparatus operates in a multi-sum mode. Some implementations further include a comparison device coupled to the pixel apparatus and a CIS including the pixel apparatus.

In an embodiment, a pixel apparatus can include a pixel circuit having multiple pixels, each pixel including photoelectric conversion element and structured to receive incident light and output an output signal having pixel voltages in response to the received incident light, the pixel circuit operated in at least one of a quad mode outputting the output signal based on photocharges from a single photoelectric conversion element and a multi-sum mode outputting the output signal based on photocharges from multiple photoelectric conversion elements; and a voltage attenuator coupled to the pixel circuit and enabled, when the pixel circuit operates in the multi-sum mode, to receive the output signal and adjust the pixel voltages of the output signal by a predetermined ratio determined by the multi-sum mode.

The voltage attenuator can adjust the pixel voltages by a predetermined ratio that is determined based on the number of the multiple photoelectric conversion elements used to output the output signal in the multi-sum mode. By the way of example but not limitation, the voltage attenuator adjusts the pixel voltages based on a voltage division method. The adjusted pixel voltages have a maximum value which is smaller than the pixel voltages.

In an embodiment, a comparison device can include a pixel circuit, having multiple pixels, each pixel including photoelectric conversion element and structured to receive incident light and output an output signal having pixel voltages in response to the received incident light, the pixel circuit operated in a quad mode outputting the output signal based on photocharges from a single photoelectric conversion element only or multi-sum mode outputting the output signal based on photocharges from multiple photoelectric conversion elements; a voltage attenuator coupled to the pixel circuit and enabled, when the pixel circuit operates in the multi-sum mode, to receive the output signal and adjust the pixel voltages of the output signal by a predetermined ratio determined by the multi-sum mode; and a comparator coupled to the voltage attenuator and structured to receive the adjusted pixel voltages and generate a comparison signal by compare a ramp signal with the adjusted pixel voltage.

The predetermined ratio is determined based on the number of the multiple photoelectric conversion elements used to output the output signal in the multi-sum mode. For example, the voltage attenuator can adjust the pixel voltages based on a voltage division method. The voltage attenuator adjusts the pixel voltages to be within an input range of the comparator. The adjusted pixel voltages have a maximum value which is smaller than the pixel voltages. The voltage attenuator can have a ratio set to the double or quadruple of a value obtained by dividing the maximum voltage of a pixel voltage corresponding to each pixel within the multi-pixel structure by the input range.

A complementary metal oxide semiconductor (CMOS) image sensor (CIS) can include a pixel array having multiple pixels, each pixel including photoelectric conversion element and structured to receive incident light and output an output signal having pixel voltages in response to the received incident light, the pixel circuit operated in a quad mode outputting the output signal based on photocharges from a single photoelectric conversion element only or multi-sum mode outputting the output signal based on photocharges from multiple photoelectric conversion elements; a row decoder coupled to the pixel array and structured to select some pixels coupled to a row line; a voltage attenuation block coupled to the pixel array and enabled, when the pixel circuit operates in the multi-sum mode, to receive the output signal and adjust the pixel voltages of the output signal by a predetermined ratio determined by the multi-sum mode; a ramp signal generator structured to generating a ramp signal; a comparison unit coupled to the voltage attenuation block and the ramp signal generator and structured to compare the ramp signal with the adjusted pixel voltages to generate a comparison result; a counting unit coupled to the comparison unit and structured to count a clock according to the comparison result and generate counting information; a memory unit coupled to the counting unit and structured to store counting information from the counting unit; a control unit coupled to the memory unit and structured to control operations of the row decoder, the voltage attenuation block, the ramp signal generator, the comparison unit, the counting unit and the memory unit; and a column readout circuit coupled to the memory unit and the control unit and structured to output data of the memory unit under control of the control unit.

In an embodiment, a pixel apparatus includes: a pixel circuit having multiple pixels, each pixel including photoelectric conversion element and configured to receive incident light and output an output signal having pixel voltages in response to the received incident light, the pixel circuit operated in a quad mode outputting the output signal based on photocharges from a single photoelectric conversion element only or multi-sum mode outputting the output signal based on photocharges from multiple photoelectric conversion elements; and a voltage attenuator coupled to the pixel circuit and configured to receive the output signal and adjust the pixel voltages of the output signal when the pixel circuit operates in the multi-sum mode.

In an embodiment, a comparison device includes: a pixel circuit, having multiple pixels, each pixel including photoelectric conversion element and configured to receive incident light and output an output signal having pixel voltages in response to the received incident light, the pixel circuit operated in a quad mode outputting the output signal based on photocharges from a single photoelectric conversion element only or multi-sum mode outputting the output signal based on photocharges from multiple photoelectric conversion elements; a voltage attenuator coupled to the pixel circuit and configured to receive the output signal and adjust the pixel voltages of the output signal by a predetermined ratio when the pixel circuit operates in the multi-sum mode; and a comparator coupled to the voltage attenuator and configured to receive the adjusted pixel voltages and generate a comparison signal by compare a ramp signal with the adjusted pixel voltage.

In an embodiment, a complementary metal oxide semiconductor (CMOS) image sensor (CIS) includes: a pixel array having multiple pixels, each pixel including photoelectric conversion element and configured to receive incident light and output an output signal having pixel voltages in response to the received incident light, the pixel circuit operated in a quad mode outputting the output signal based on photocharges from a single photoelectric conversion element only or multi-sum mode outputting the output signal based on photocharges from multiple photoelectric conversion elements; a row decoder coupled to the pixel array and configured to select some pixels coupled to a row line; a voltage attenuation block coupled to the pixel array and configured to receive the output signal and adjust the pixel voltages of the output signal by a predetermined ratio when the pixel circuit operates in the multi-sum mode; a ramp signal generator configured to generating a ramp signal; a comparison unit coupled to the voltage attenuation block and the ramp signal generator and configured to compare the ramp signal with the adjusted pixel voltages to generate a comparison result; a counting unit coupled to the comparison unit and configured to count a clock according to the comparison result and generate counting information; a memory unit coupled to the counting unit and configured to store counting information from the counting unit; a control unit coupled to the memory unit and configured to control operations of the row decoder, the voltage attenuation block, the ramp signal generator, the comparison unit, the counting unit and the memory unit; and a column readout circuit coupled to the memory unit and the control unit and configured to output data of the memory unit under control of the control unit.

In an embodiment, a pixel apparatus may include: a pixel circuit, having a multi-pixel structure, suitable for outputting a plurality of pixel voltages, each outputted from each pixel, corresponding to incident light; and a voltage attenuator suitable for dropping each voltage level of at least some among the plurality pixel voltages, outputted from the pixel circuit, in a predetermined ratio when a multi-sum mode is performed.

In an embodiment, a comparison device may include: a pixel circuit, having a multi-pixel structure, suitable for outputting a pixel voltage corresponding to incident light; a voltage attenuator suitable for adjusting the pixel voltage outputted from the pixel circuit in case of a multi-sum mode; and a comparator suitable for comparing a ramp signal to the pixel voltage adjusted by the voltage attenuator, and outputting a comparison signal.

In an embodiment, a CIS may include: a pixel array, having a multi-pixel structure, suitable for outputting pixel voltages corresponding to incident light; a row decoder suitable for selecting and controlling a pixel within the pixel array at each row line; a voltage attenuation block suitable for adjusting the pixel voltages outputted from the pixel array in case of a multi-sum mode; a ramp signal generator suitable for generating a ramp signal; a comparison unit suitable for comparing the ramp signal from the ramp signal generator to the pixel voltages adjusted by the voltage attenuation block; a counting unit suitable for counting a clock according to each of output signals from the comparison device; a memory unit suitable for storing counting information from the counting unit; a control unit suitable for controlling the operations of the row decoder, the voltage attenuation block, the ramp signal generator, the comparison unit, the counting unit and the memory unit; and a column readout circuit suitable for outputting the data of the memory unit under control of the control unit.

DETAILED DESCRIPTION

The disclosed technology can be implemented to provide a pixel apparatus and an image sensor including the pixel apparatus which can sufficiently use a dynamic range of the image sensor. For the sufficient use of the dynamic range, the suggested pixel apparatus can adjust an output signal to a value that is within an input range of a comparator which is coupled to the pixel apparatus and structured to perform a comparison with the output signal with a ramp signal. Such adjustment is made depending on a mode of the image sensor, for example, whether the image sensor operates in a quad mode or multi-sum mode. Since the output signal from a pixel array can be adjusted as a value within the input range of the comparator, the dynamic change can be sufficiently used.

Hereafter, exemplary embodiments will be described with reference to the accompanying drawings, such that the technical idea of the disclosure can be easily carried out by a person skilled in the art to which the disclosure pertains.

Throughout the specification, when one element is referred to as being "connected to" or "coupled to" another element, it may indicate that the former element is "directly connected or coupled to" the latter element or the former element is "electrically connected or coupled to" the latter element with another element interposed therebetween. Furthermore, when an element "includes" or "has" a component, it may indicate that the element does not exclude another component but can further include another component, unless referred to the contrary. In addition, throughout the specification, the terms of a singular form may include plural forms unless referred to the contrary.

In this specification, a quad mode indicates a mode of a pixel array or circuit for outputting an output signal based on photocharges from a single photo sensitive device (for example, PD) only. A multi-sum mode indicates a mode of the pixel array or circuit for outputting the output signal based on photocharges from multiple photo sensitive devices. As an example of the multi-sum mode, a 4-sum mode indicates a mode of the pixel array or circuit in which the output signal is generated based on photocharges from four photosensitive devices.

Figure 1:
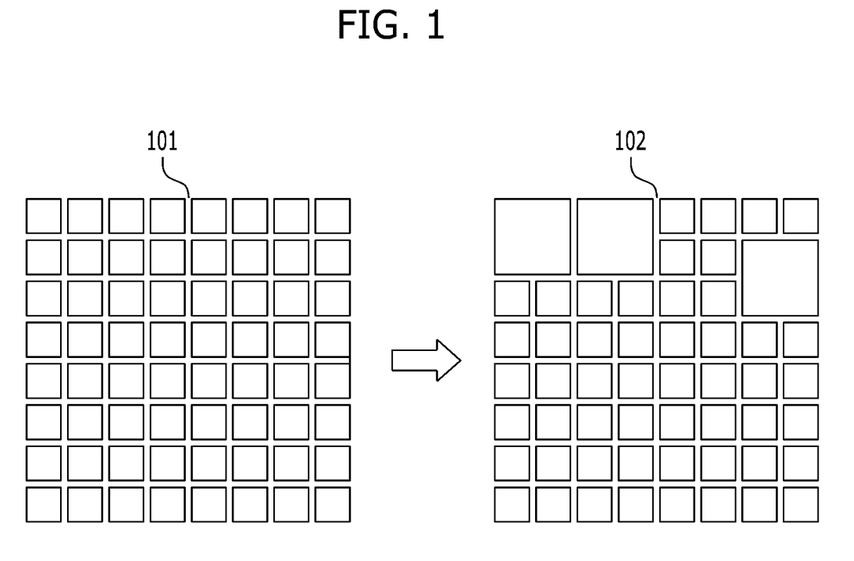
FIG. 1 is a diagram for describing a general pixel binning process.

FIG. 1 is a diagram for describing a pixel binning process for promoting understandings of embodiments. The pixel binning is a clocking scheme used to combine the charges collected by several adjacent pixels, and is designed to reduce noise and improve the signal-to-noise ratio and frame rate of digital cameras.

In FIG. 1, reference numeral "101" represents a pixel array in which current pixels from which an image is generated are not binned, and reference numeral "102" represents the pixel array in which some of the current pixels from which an image is generated are 2×2 binned. The binned pixels in the pixel array 102 may be considered as one pixel to generate an image.

In general, a pixel binning unit (not illustrated) may perform pixel binning on a current pixel based on the output level of the current pixel.

The performing of the pixel binning on the current pixel may indicate adding the output level of the current pixel to the output levels of neighboring pixels adjacent to the current pixel. When the pixel binning is performed, the output level is higher than when the pixel binning is not performed. Thus, the pixel binning can improve the precision of the pixel array 102.

When the current pixel is binned, the start point may be arbitrarily set. Furthermore, since the neighboring pixels adjacent to the current pixel are highly likely to display an image having a similar characteristic to the current pixel, the pixel binning unit may bin the neighboring pixels adjacent to the current pixel with the current pixel. The pixel binning unit may determine neighboring pixels to be binned with the current pixel, such that the pixels are binned in a square shape, for example, of 2×2 or 3×3. In some cases, however, the pixel binning unit may determine the neighboring pixels such that the pixels are binned in a rectangular shape.

In a general pixel structure, when a 4-pixel structure, supporting a 4-sum mode, is used, a signal-to-noise ratio (SNR) may be further improved by approximately 6 dB through Equation 1 below than when a general Bayer quad pixel structure, supporting a quad mode, is used.

$$20 \log(4\text{signal}/\sqrt{4\text{signal}})$$ [Equation 1]

In Equation 1, "signal" represents the intensity of a signal outputted from one pixel.

Figure 2:
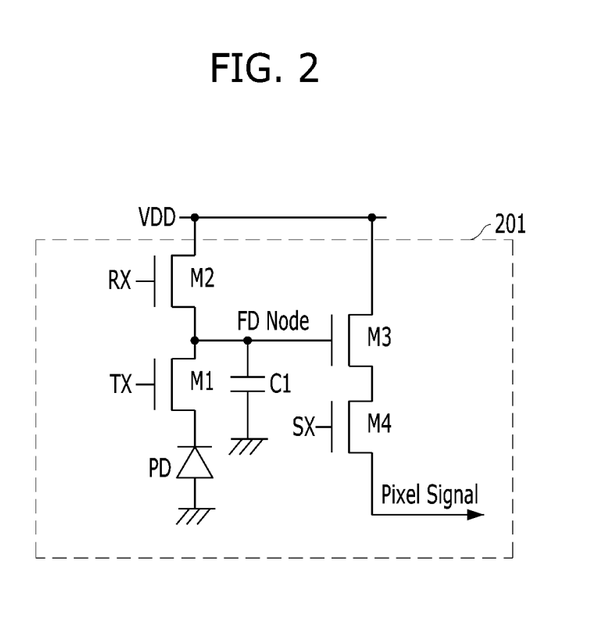
FIG. 2 is a circuit diagram of a pixel apparatus for promoting understandings of embodiments.

FIG. 2 is a circuit diagram of a pixel apparatus for promoting understandings of the embodiments, illustrating a pixel apparatus 201 with a 4-transistor structure.

Referring to FIG. 2, the pixel apparatus 201 may include a photodiode, a photo sensitive device or photoelectric conversion element PD, a transfer transistor M1, a reset transistor M2, a drive transistor M3 and a select transistor M4.

At this time, the photo sensitive device PD may perform a photoelectric conversion function and may be referred to as photoelectric conversion element. Thus, the photo sensitive device PD may receive light from outside, and generate a photocharge based on the received light. The photo sensitive device PD may be turned on or off in response to a control signal outputted from a control unit (not illustrated). When the photo sensitive device PD is turned on, the photo sensitive device PD may sense incident light and generate a photocharge in response to the incident light. On the other hand, when the photo sensitive device PD is turned off, the photo sensitive device PD may not sense incident light. The photo sensitive device PD may be configured as any one of a photo diode, a photo transistor, a photo gate, a pinned photo diode (PPD) and combinations thereof.

The transfer transistor M1 may transfer the photocharge of the photo sensitive device PD coupled to one terminal thereof to a floating diffusion node coupled to the other terminal thereof, in response to a transfer control signal TX applied to a gate terminal thereof from a row decoder (not illustrated).

The reset transistor M2 may transfer a power supply voltage VDD applied from one terminal thereof to the floating diffusion node coupled to the other terminal thereof, in response to a reset control signal RX applied to a gate terminal thereof from the row decoder. Thus, the reset transistor M2 may reset the photocharge stored in the floating diffusion node in response to the reset control signal RX. The power supply voltage applied to a terminal (e.g., a drain) of the reset transistor M2 may be considered as a reset voltage by the reset transistor M2.

The drive transistor M3 may have one terminal coupled to the power supply voltage, generate an electrical signal corresponding to the charge stored in the floating diffusion node coupled to a gate terminal thereof, and output the generated electrical signal to the other terminal thereof. At this time, the drive transistor M3 may serve as a source follower buffer amplifier.

The select transistor M4 may operate in response to a select control signal SX applied to a gate terminal thereof from the row decoder, and output the electrical signal applied to one terminal thereof from the drive transistor M3 as a pixel signal (pixel voltage) through the other terminal thereof. At this time, the select transistor M4 may perform switching and address operations for selecting the pixel apparatus 201 in response to the select control signal SX.

The floating diffusion node may indicate a diffusion region constituting the other terminals of the transfer transistor M1 and the reset transistor M2. Since a charge corresponding to an image signal and a charge corresponding to a reset voltage is stored in the diffusion region, the floating diffusion node may be modeled as a unique capacitor C1 of the floating diffusion node.

Figure 3:
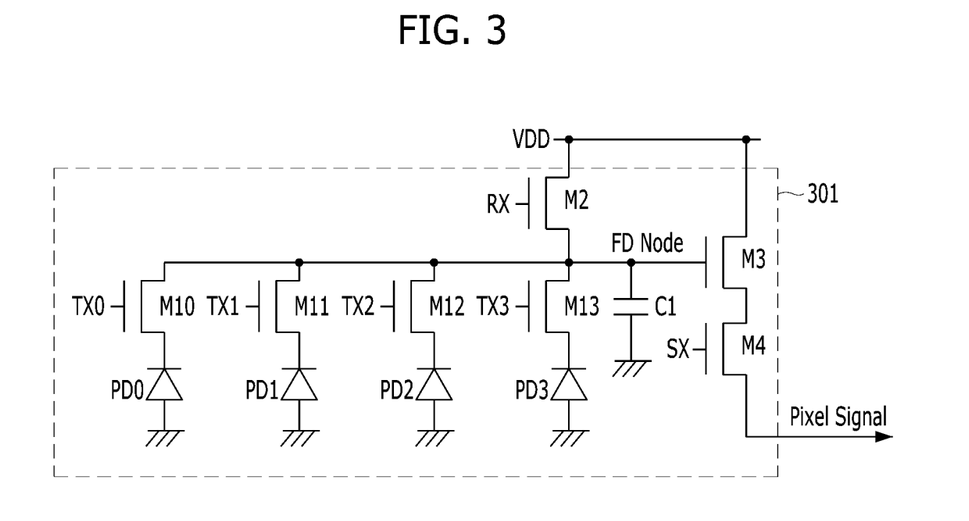
FIG. 3 is a circuit diagram of a 2×2 shared-type pixel apparatus for promoting understandings of embodiments.

FIG. 3 is a circuit diagram of a 2×2 shared-type pixel apparatus 301 for promoting understandings of the embodiments. Herein, the 2×2 shared-type pixel apparatus 301 can be structured to support a 4-sum mode outputting a signal from four pixels arranged in neighboring rows and columns (2×2).

In FIG. 3, a reset transistor M2, a drive transistor M3 and a select transistor M4 may operate in the same manner as the reset transistor M2, the drive transistor M3 and the select transistor M4 of FIG. 2, respectively, each of four transfer transistors M10 to M13 may operate in the same manner as the transfer transistor M1 of FIG. 2, and each of four photo sensitive devices PD0 to PD3 may operate in the same manner as the photo sensitive device PD of FIG. 2. Therefore, the detailed descriptions thereof are omitted herein.

As illustrated in FIG. 3, the four transfer transistors M10 to M13 may transfer photocharges of the photo sensitive devices PD0 to PD3 coupled to one terminals of the four transfer transistors M10 to M13 to a floating diffusion node coupled to the other terminals of the four transfer transistors M10 to M13 in response to transfer control signals TX0 to TX3 applied to gate terminals thereof from a row decoder (not illustrated).

A pixel voltage Vpix outputted from the pixel apparatus 301 may be set as a value as large as possible in light of noise characteristics, assuming that the pixel apparatus 301 operates in the quad mode having 1×Q output. 'Q' represents photocharges outputted from one photo sensitive device PD. For example, the pixel voltage Vpix may be set to a maximum of approximately 500 mV. In the 4-sum mode having 4×Q output, however, a maximum pixel voltage of approximately 2V may be outputted because the 4-sum mode has 4×Q output. When an analog-digital converter (ADC) is interconnected with an image sensor, the ADS usually has an input range of 0 to 600 mV, and thus, only about 1.2×Q of 4×Q is used. In this case, the dynamic range may be not sufficiently used.

Thus, in an embodiment, a voltage attenuator may be used to adjust a pixel voltage in a multi-sum mode, for example, 4 sum mode, which makes it possible to sufficiently use the dynamic range. This configuration will be described in detail with reference to FIG. 4.

In an embodiment, a 4-pixel structure, supporting a 4-sum mode, will be taken as an example for description. However, the embodiment may be not limited to the 4-pixel structure and can also be applied to other pixel structures including a 2-pixel structure supporting a 2-sum mode, 8-pixel structure supporting a 8-sum mode, or 16-pixel structure supporting a 16-sum mode. Here, the 4 pixel structure indicates the pixel structure where 4 photo sensing devices are coupled to a same floating diffusion node and the 2 pixel structure, 8 pixel structure, and 16 pixel structure indicate the pixel structures in which 2, 8, and 16 photo sensing devices are coupled to a same floating diffusion node.

Figure 4:
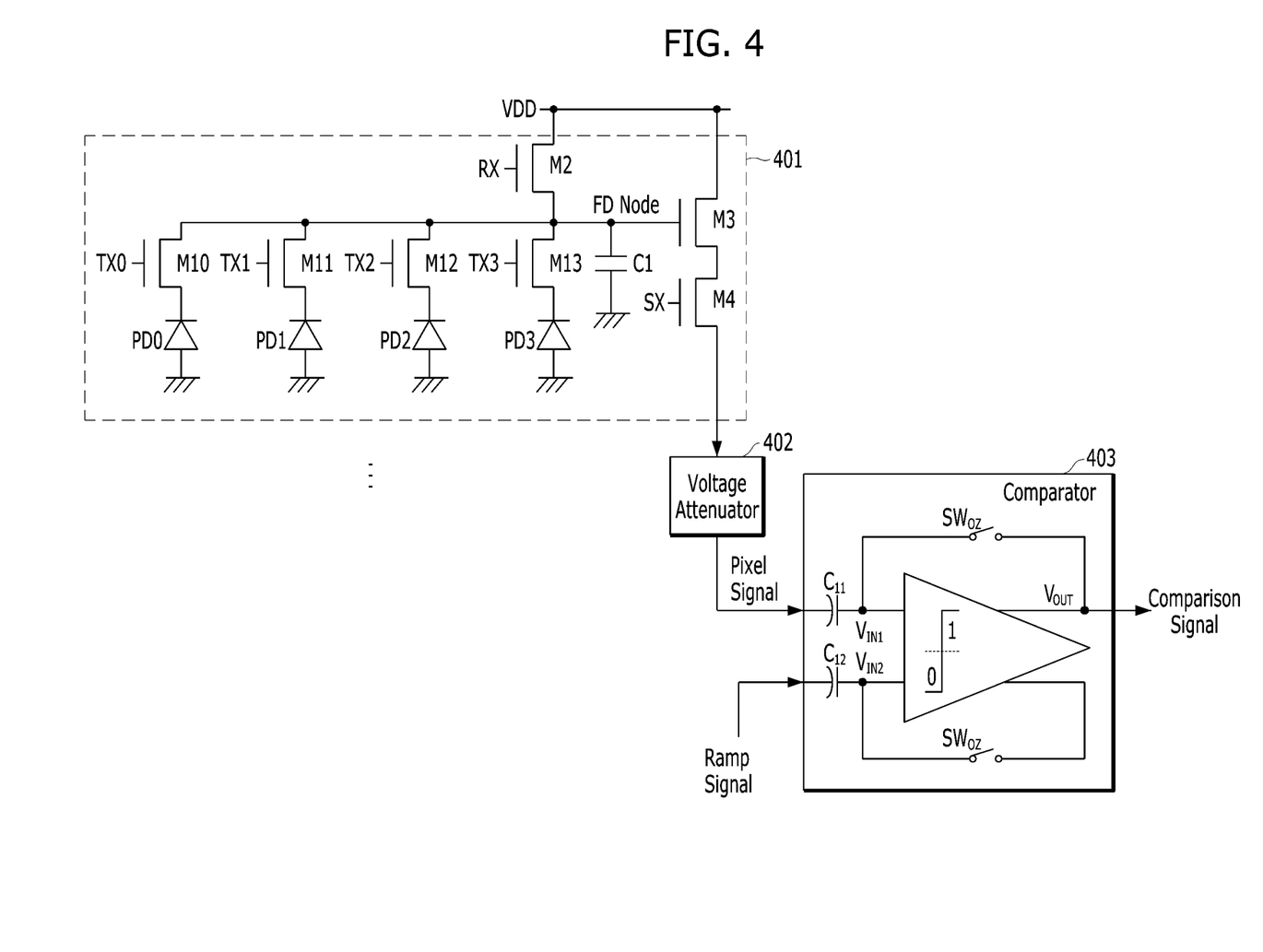
FIG. 4 is a configuration diagram of an example of a pixel apparatus and a comparison device based on an embodiment of the disclosed technology.

FIG. 4 is a configuration diagram illustrating a pixel apparatus and a comparison device in accordance with an embodiment.

As illustrated in FIG. 4, the pixel apparatus in accordance with the embodiment may have a multi-pixel structure, and include a pixel circuit 401, a voltage attenuator 402 and a comparator 403. The pixel circuit 401 may output a pixel voltage corresponding to incident light. The voltage attenuator 402 may adjust the pixel voltage outputted from the pixel circuit 401, when the pixel apparatus operates in the multi-sum mode. The comparator 403 may be coupled to the pixel circuit 410 to receive the pixel voltage adjusted by the voltage attenuator 402. The comparator 403 may compare a ramp signal with the adjusted pixel voltage and output a comparison signal.

At this time, since the pixel circuit 401 is configured and operated in the same manner as the pixel apparatus 301 described with reference to FIG. 3, the detailed descriptions thereof will be omitted herein. In some implementations, the pixel circuit 401 may be operated in the quad mode or the multi mode, for example, the 4-sum mode. In the case of the 4-sum mode, the pixel circuit 401 may be operated in a sum binning mode in which all or only two of four pixels are selected.

In the multi-sum mode, the voltage attenuator 402 may attenuate the pixel voltage outputted from the pixel circuit 401 at a predetermined ratio (for example, 0.6 times), and transfer the attenuated voltage to the comparator 403. In some implementations, the maximum value of the voltage outputted from the voltage attenuator 402 may be 1.2 times smaller than the maximum value of each pixel voltage. According to an embodiment, the predetermined ratio can be determined based on how many neighboring pixels are combined to provide the pixel voltage in the multi-sum mode.

In some implementations, the voltage attenuator 402 may attenuate the pixel voltage outputted from the pixel circuit 401 at the predetermined ratio using a voltage division method, and transfer the attenuated pixel voltage to the comparator 403. Thus, the voltage attenuator 402 may transfer a predetermined ratio of the pixel voltage outputted from the pixel circuit 401 to the comparator 403, and transfer the remains voltage of the pixel voltage outputted from the pixel circuit 401 to the ground voltage VSS.

In some implementations, the voltage attenuator 402 may be structured to operate when the pixel circuit 401 is in the multi-sum mode, for example, 4-sum mode, while the voltage attenuator 402 may not operate when the pixel circuit 401 is in the quad mode. The selective operation of the voltage attenuator 402 depending on the operation mode of the pixel circuit 401, for example, whether the pixel circuit is in the multi-sum mode or the quad mode, may be performed under control of the control unit (for example, 580 of FIG. 5 which will be described below).

Since the circuit configuration and operation of the comparator 403 are publicly known, the detailed descriptions thereof will be omitted herein.

In this patent document, the voltage attenuator 402 attenuates the pixel voltage from the pixel circuit 401 to adjust the pixel voltage to be within the input range of the comparator 403. Thus, the voltage attenuator 402 may adjust (generally drop) the pixel voltage from the pixel circuit 401 to a value within the input range of the comparator 403, because a voltage level beyond the input range of the comparator 403 cannot be represented using an image resolution of the CIS.

For example, in the case of the 4-sum mode, the pixel circuit 401 may be operated in the sum binning mode in which only two pixels are selected to have 2×Q output. If each pixel has an output of 500 mV, the pixel circuit 401 has 2×Q output, i.e., 1V. If the comparator 403 has an input range of 0 to 600 mV, only 600 mV in the pixel voltage of 1V may be inputted to the comparator 403. Thus, only 1.2×Q of 2×Q may be used.

Therefore, in the case of the 4-sum mode, when only two pixels (2×Q output) are selected in the sum binning mode, the voltage attenuator 402 may adjust the pixel voltage according to the predetermined ratio. For example, the voltage attenuator 402 may adjust the pixel voltage by attenuating the pixel voltage of 1V outputted from the two pixels to 600 mV, according to the predetermined ratio (for example, 0.6 times). Thus, the attenuation allows to use the entire 2×Q, which makes it possible to sufficiently use the dynamic range.

In some implementations, in the case of the 4-sum mode, the pixel circuit 401 may be operated in the sum binning mode in which four pixels are all selected. In this case, the predetermined ratio of the voltage attenuator 402 may be changed, or the pixel voltage may be attenuated through a plurality of voltage attenuators 402.

Figure 5:
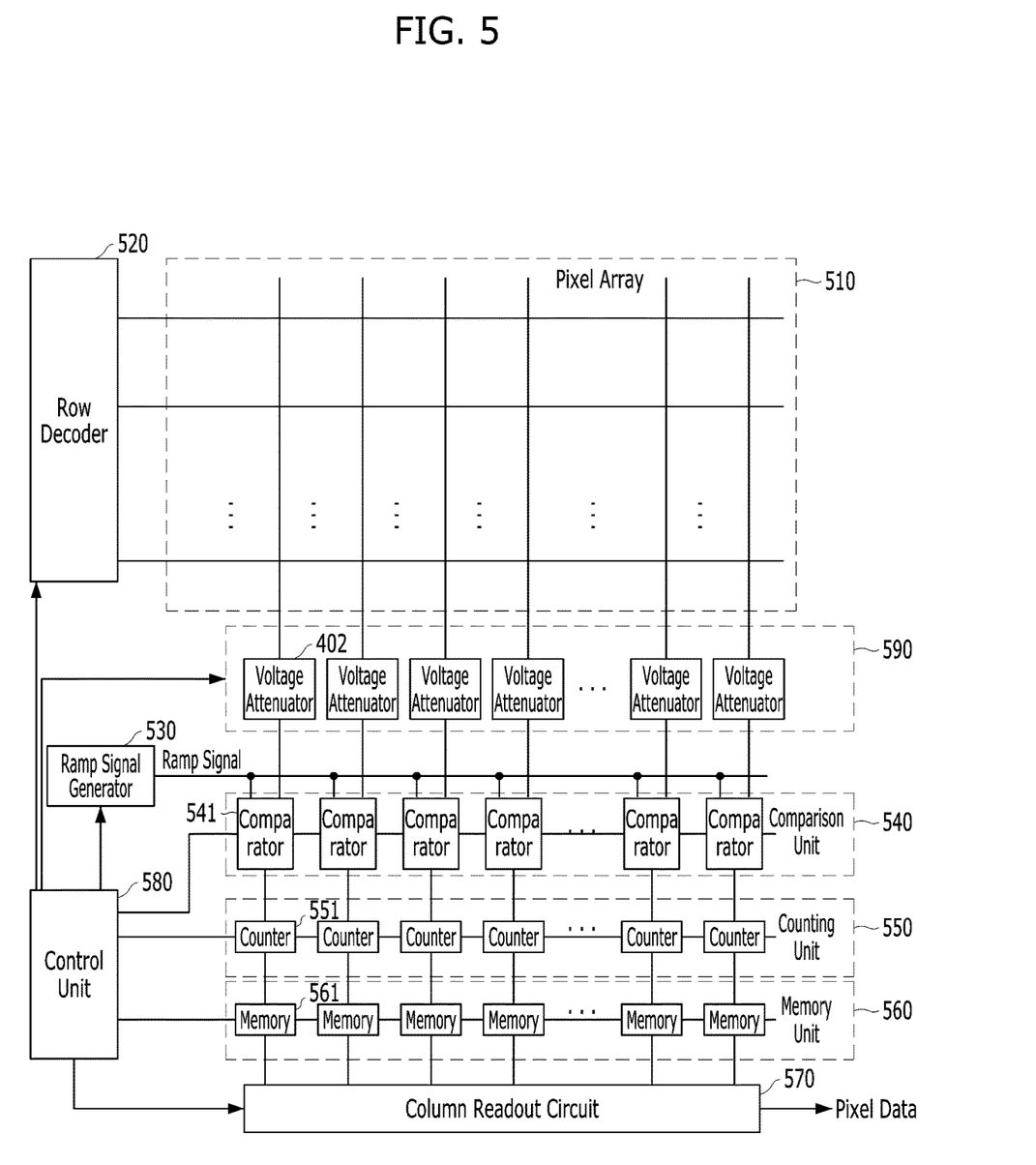
FIG. 5 is a configuration diagram of an example of a CIS based on an embodiment of the disclosed technology.

FIG. 5 is a configuration diagram illustrating a complementary metal oxide semiconductor (CMOS) image sensor (CIS) in accordance with an embodiment.

As illustrated in FIG. 5, the CIS in accordance with the embodiment may have a multi-pixel structure, and include a pixel array 510, a row decoder 520, a voltage attenuation block 590, a ramp signal generator 530, a comparison unit 540, a counting unit 550, a memory unit 560, a control unit 580 and a column readout circuit 570. The pixel array 510 may output pixel voltages corresponding to incident light. The row decoder 520 may select a pixel in the pixel array 510 at each row line and control an operation of the selected pixel, under control of the control unit 580. The voltage attenuation block 590 may adjust the pixel voltages outputted from the pixel array 510 in case of a multi-sum mode, in response to a control signal generated by the control unit 580. The control signal can determine whether the voltage attenuation block 590 operates or not depending on each mode). The ramp signal generator 530 may generate a ramp signal under control of the control unit 580. The comparison unit 540 may compare the ramp signal applied from the ramp signal generator 530 with the pixel voltages adjusted by the voltage attenuation block 590. The counting unit 550 may count a clock applied from the control unit 580 according to each of output signals from the comparison unit 540. The memory unit 560 may store the counting information from the counting unit 550 under control of the control unit 580. The control unit 580 may control the operations of the row decoder 520, the voltage attenuation block 590, the ramp signal generator 530, the comparison unit 540, the counting unit 550, the memory unit 560 and the column readout circuit 570. The column readout circuit 570 may sequentially output the data of the memory unit 560 as pixel data PXDATA under control of the control unit 580.

At this time, the voltage attenuation block 590 may attenuate the pixel voltages outputted from the pixel array 510 at a predetermined ratio, and transfer the attenuated pixel voltages to the comparison unit 540. Thus, the voltage attenuation block 590 may attenuate the pixel voltages outputted from the pixel array 510 at the predetermined ratio using a voltage division method, and transfer the attenuated pixel voltages to the comparison unit 540. Therefore, the voltage attenuation block 590 may adjust the pixel voltages from the pixel array 510 to be within the input range of the comparison unit 540. For example, the voltage attenuation block 590 may have a ratio set to the double or quadruple of a value obtained by dividing the maximum value of the pixel voltage by the input range of the comparison unit 540.

The CIS can compare pixel signals (pixel voltages) before and after a light signal is incident, and actually measure only a pixel signal generated in response to incident light, in order to remove an offset value of the pixel. Such a technique may be referred to as correlated double sampling (CDS). The CDS may be performed by the comparison unit 540.

The voltage attenuation block 590 may include the plurality of voltage attenuators 402 described above with reference to FIG. 4, the comparison unit 540 may include a plurality of comparators, the counting unit 550 may include a plurality of counters, and the memory unit 560 may include a plurality of memories. At this time, the comparators, the counters and the memories may be provided at the respective columns.

Referring to FIG. 5, operations of one voltage attenuator, one comparator, one counter and one memory will be described as follows.

First, a first comparator 541 may receive a pixel voltage through one terminal thereof, the pixel voltage being outputted from a first column of the pixel array 510 and adjusted by a first voltage attenuator 402, receive a ramp signal applied from the ramp signal generator 530 through the other terminal thereof, compare the values of the two signals according to a control signal from the control unit 580, and output a comparison signal.

Since the ramp signal $V_{RAMP}$ has a voltage level that increases or decreases to a predetermined magnitude as the time has elapsed after initialization was started, the values of the two signals inputted to the respective terminals of the comparator may coincide with each other at a certain point of time. After the point of time that the values of the two signals coincide with each other, the value of the comparison signal outputted from the comparator may be inverted.

Therefore, a first counter 551 may count a clock applied from the control unit 580 from a point of time when the ramp signal falls to a point of time when the comparison signal outputted from the comparator 541 is inverted, and output the counting information. The counter may be reset according to a reset control signal from the control unit 580.

Then, a first memory 561 may store the counting information from the counter 551 according to a load control signal from the control unit 580, and output the counting information to the column readout circuit 570.

At this time, the CIS may count a reset signal (reset voltage) and then count an image signal (signal voltage).

In accordance with the embodiments, the pixel apparatus, the comparison device and the CIS can adjust the pixel voltage using the voltage attenuator in case of the multi-sum mode, thereby sufficiently using the dynamic range.

Furthermore, since sum binning can be performed, the performance can be further improved than average binning.

Although various embodiments have been described for illustrative purposes, it will be apparent to those skilled in the art that various changes and modifications can be further made based on the disclosed technology.

What is claimed is:

1. A pixel apparatus comprising:
a pixel circuit having multiple pixels, each pixel including a photoelectric conversion element and structured to receive incident light and output an output signal having pixel voltages in response to the received incident light, the pixel circuit operated in at least one of a quad mode outputting the output signal based on photocharges from a single photoelectric conversion element and a multi-sum mode outputting the output signal based on photocharges from multiple photoelectric conversion elements; and
a voltage attenuator coupled to the pixel circuit and enabled, when the pixel circuit operates in the multi-sum mode, to receive the output signal and adjust the pixel voltages of the output signal by a predetermined ratio determined by the multi-sum mode,
wherein the adjusted pixel voltages have a maximum value which is smaller than the pixel voltages.

2. The pixel apparatus of claim 1, wherein the voltage attenuator adjusts the pixel voltages by a predetermined ratio that is associated with the number of the multiple photoelectric conversion elements used to output the output signal in the multi-sum mode.

3. The pixel apparatus of claim 1, wherein the voltage attenuator adjusts the pixel voltages based on a voltage division method.

4. A comparison device comprising:
- a pixel circuit, having multiple pixels, each pixel including a photoelectric conversion element and structured to receive incident light and output an output signal having pixel voltages in response to the received incident light, the pixel circuit operated in a quad mode outputting the output signal based on photocharges from a single photoelectric conversion element only or multi-sum mode outputting the output signal based on photocharges from multiple photoelectric conversion elements;
- a voltage attenuator coupled to the pixel circuit and enabled, when the pixel circuit operates in the multi-sum mode, to receive the output signal and adjust the pixel voltages of the output signal by a predetermined ratio determined by the multi-sum mode; and
- a comparator coupled to the voltage attenuator and structured to receive the adjusted pixel voltages and generate a comparison signal by compare a ramp signal with the adjusted pixel voltage,
- wherein the adjusted pixel voltages have a maximum value which is smaller than the pixel voltages.

5. The comparison device of claim 4, wherein the predetermined ratio is associated with the number of the multiple photoelectric conversion elements used to output the output signal in the multi-sum mode.

6. The comparison device of claim 4, wherein the voltage attenuator adjusts the pixel voltages based on a voltage division method.

7. The comparison device of claim 4, wherein the voltage attenuator adjusts the pixel voltages to be within an input range of the comparator.

8. A comparison device comprising:
- a pixel circuit, having multiple pixels, each pixel including a photoelectric conversion element and structured to receive incident light and output an output signal having pixel voltages in response to the received incident light, the pixel circuit operated in a quad mode outputting the output signal based on photocharges from a single photoelectric conversion element only or multi-sum mode outputting the output signal based on photocharges from multiple photoelectric conversion elements;
- a voltage attenuator coupled to the pixel circuit and enabled, when the pixel circuit operates in the multi-sum mode, to receive the output signal and adjust the pixel voltages of the output signal by a predetermined ratio determined by the multi-sum mode; and
- a comparator coupled to the voltage attenuator and structured to receive the adjusted pixel voltages and generate a comparison signal by compare a ramp signal with the adjusted pixel voltage,
- wherein the voltage attenuator adjusts the pixel voltages to be within an input range of the comparator, and
- wherein the voltage attenuator has a ratio set to the double or quadruple of a value obtained by dividing the maximum voltage of a pixel voltage corresponding to each pixel within the multi-pixel structure by the input range.

9. The comparison device of claim 8, wherein the voltage attenuator adjusts the pixel voltages by a predetermined ratio that is associated with the number of the multiple photoelectric conversion elements used to output the output signal in the multi-sum mode.

10. A complementary metal oxide semiconductor (CMOS) image sensor (CIS) comprising:
- a pixel array having multiple pixels, each pixel including a photoelectric conversion element and structured to receive incident light and output an output signal having pixel voltages in response to the received incident light, the pixel circuit operated in a quad mode outputting the output signal based on photocharges from a single photoelectric conversion element only or multi-sum mode outputting the output signal based on photocharges from multiple photoelectric conversion elements;
- a row decoder coupled to the pixel array and structured to select some pixels coupled to a row line;
- a voltage attenuation block coupled to the pixel array and enabled, when the pixel circuit operates in the multi-sum mode, to receive the output signal and adjust the pixel voltages of the output signal by a predetermined ratio determined by the multi-sum mode;
- a ramp signal generator structured to generating a ramp signal;
- a comparison unit coupled to the voltage attenuation block and the ramp signal generator and structured to compare the ramp signal with the adjusted pixel voltages to generate a comparison result;
- a counting unit coupled to the comparison unit and structured to count a clock according to the comparison result and generate counting information;
- a memory unit coupled to the counting unit and structured to store counting information from the counting unit;
- a control unit coupled to the memory unit and structured to control operations of the row decoder, the voltage attenuation block, the ramp signal generator, the comparison unit, the counting unit and the memory unit; and
- a column readout circuit coupled to the memory unit and the control unit and structured to output data of the memory unit under control of the control unit,
- wherein the adjusted pixel voltages have a maximum value which is smaller than the pixel voltages.

11. The CIS of claim 10, wherein the predetermined ratio is associated with the number of the multiple photoelectric conversion elements used to output the output signal in the multi-sum mode.

12. The CIS of claim 10, wherein the voltage attenuator adjusts the pixel voltages based on a voltage division method.

13. The CIS of claim 10, wherein the voltage attenuator adjusts the pixel voltages to be within an input range of the comparator.

14. A complementary metal oxide semiconductor (CMOS) image sensor (CIS) comprising:
- a pixel array having multiple pixels, each pixel including a photoelectric conversion element and structured to receive incident light and output an output signal having pixel voltages in response to the received incident light, the pixel array operated in a quad mode outputting the output signal based on photocharges from a single photoelectric conversion element only or multi-sum mode outputting the output signal based on photocharges from multiple photoelectric conversion elements;
- a row decoder coupled to the pixel array and structured to select some pixels coupled to a row line;
- a voltage attenuation block coupled to the pixel array and enabled, when the pixel array operates in the multi-sum mode, to receive the output signal and adjust the pixel voltages of the output signal by a predetermined ratio determined by the multi-sum mode;

a ramp signal generator structured to generating a ramp signal;

a comparison unit coupled to the voltage attenuation block and the ramp signal generator and structured to compare the ramp signal with the adjusted pixel voltages to generate a comparison result a counting unit coupled to the comparison unit and structured to count a clock according to the comparison result and generate counting information;

a memory unit coupled to the counting unit and structured to store counting information from the counting unit;

a control unit coupled to the memory unit and structured to control operations of the row decoder, the voltage attenuation block, the ramp signal generator, the comparison unit, the counting unit and the memory unit; and a column readout circuit coupled to the memory unit and the control unit and structured to output data of the memory unit under control of the control unit, wherein the voltage attenuation block has a ratio set to the double or quadruple of a value obtained by dividing the maximum voltage of a pixel voltage corresponding to each pixel within the multi-pixel structure by the input range.

15. The CIS of claim 14, wherein the predetermined ratio is associated with the number of the multiple photoelectric conversion elements used to output the output signal in the multi-sum mode.

* * * * *